March 13, 1962  KWANG-TZU YANG  3,024,628
FLEXIBLE COUPLING

Filed Feb. 6, 1961  4 Sheets-Sheet 1

INVENTOR.
KWANG-TZU YANG
BY M. A. Hobbs
ATTORNEY

March 13, 1962 KWANG-TZU YANG 3,024,628
FLEXIBLE COUPLING

Filed Feb. 6, 1961 4 Sheets-Sheet 2

INVENTOR.
KWANG-TZU YANG
BY M. A. Hobbs
ATTORNEY

United States Patent Office 3,024,628
Patented Mar. 13, 1962

3,024,628
FLEXIBLE COUPLING
Kwang-Tzu Yang, South Bend, Ind., assignor to Dodge Manufacturing Corporation, Mishawaka, Ind., a corporation of Indiana
Filed Feb. 6, 1961, Ser. No. 87,142
3 Claims. (Cl. 64—11)

The present invention relates to flexible flange-type couplings.

In industry where rotational motion is to be transferred from one machine to another, such as from a motor to a winch, three problems may arise in the installation of the machines. First, the machines may be placed too far apart, so that the rotation transfer mechanism cannot perform, as when two clutch plates cannot touch. Second, the axles of the machines may be radially displaced, so that direct connection of the clutch plates produces a very large amount of vibration in the system, as the axle of one machine attempts to travel around the circumference of a circle concentric with the axle of the other. Finally, one axle may be angularly displaced from the other, so that clutch plates touch only on one edge and gears are subjected to great stress and are frequently damaged. To prevent one or more of these three problems from occurring, great care must be exercised in the placing of the machines, and expensive machinery must often be utilized in this process, especially when high rotational speeds are to occur.

A common method for avoiding the expensive and time-consuming precise aligning of the machines is to couple them with a flexible coupling, in this case a flange-type coupling, which will adjust to small alignment errors while rotating and will transmit the rotational energy from one machine to the other. However, each coupling has a torque limit such that it will buckle if too much torque is applied to it, and buckling damages or weakens the coupling so that it cannot withstand the torque it originally could. But to simply make the coupling very stiff so that it will not buckle is not sufficient since it may transmit excessive vibration. Thus a flexible coupling for a particular use must have a precisely determined stiffness, the stiffness being dependent on the physical geometry, construction and material of the coupling.

Conventionally, the method for designing a flange-type coupling is to make several and select the one which is best suited for the particular installation. In these tests, several couplings of each design are made, since a particular coupling is sometimes accidentally stiffer or less stiff than the original coupling of the selected design. This experimentation is very expensive and time consuming, and the only reason couplings are economical is that once a particular design is tested, it may be used wherever its characteristics are desired, so that a standard series of graded couplings may be provided. Nevertheless, in special applications experimental work must be performed as above described to find the best coupling design for the installation. It is therefore a principal object of the present invention to provide a flexible flange-type coupling having the required physical characteristics and a design criterion and formula for producing the coupling without substantial experimental work or laboratory research.

In a system of machines connected together with flexible couplings, there are several natural frequencies of torsional vibration. Since it is undesirable, if not actually harmful, for any of the possible operating frequencies of the system to coincide with one of the natural frequencies, the couplings must be chosen so that, if possible, all of the natural frequencies, which depend on the coupling stiffness, are outside of the operating range. It is sometimes difficult to design a set of couplings for a system which are neither too stiff nor too flexible for the applied torque and at the same time provide the desired location of the natural vibrational frequencies with respect to the operating range. Therefore, it is an additional object of the present invention to provide design criteria for couplings such that desired stiffness and position of the natural vibrational frequencies can be obtained.

In conventional couplings certain natural frequencies tend to rise as the impressed torque is increased. Thus, when the operating range of the coupling falls between the two natural frequencies, the lower of the two frequencies may increase with an increase in impressed torque and in effect tune the natural frequencies and the force vibration, resulting in serious damage to the coupling structure and possibly machine parts. It is therefore still another object of the invention to provide a coupling in which one or more particular natural frequencies decrease with an increase in impressed torque.

A further object of this invention is to provide a geometrical criterion for the design of flexible flange-type couplings within which the coupling will not buckle within the ordinary operating range of torques.

Whenever the cord density of a coupling exceeds a certain maximum value, the element stiffens at an increasing rate, and as a result, tends to slip out of the clamp ring holding it in place in the motor system. To prevent the production of couplings with an excessive cord density, it is desirable to have a means of determining this maximum cord density. Therefore, it is another object of the present invention to provide a formula for the determination of the maximum desirable cord density for a given thickness and size of coupling.

Additional objects and advantages will become apparent from the following description and accompanying drawings, wherein.

Figure 2:
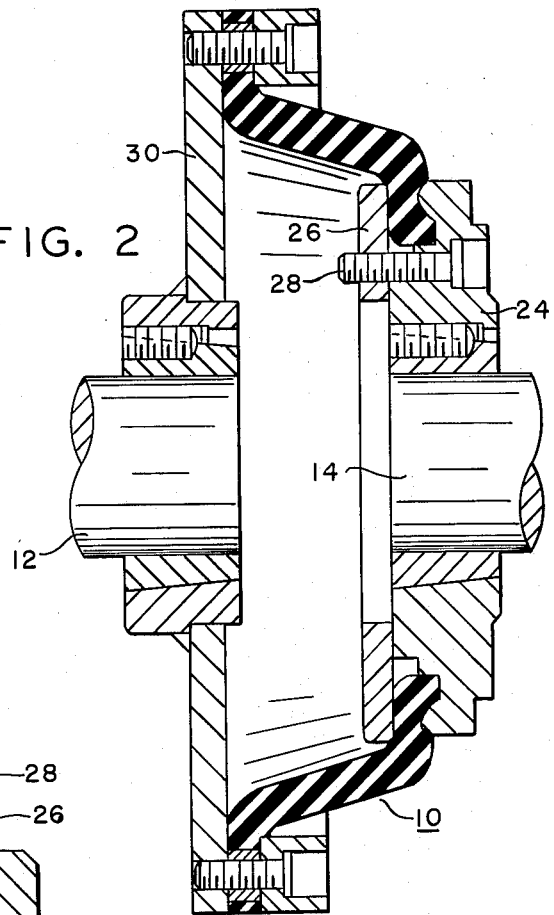
FIGURE 2 is a vertical cross sectional view of another coupling as used in another application.
Figure 1:
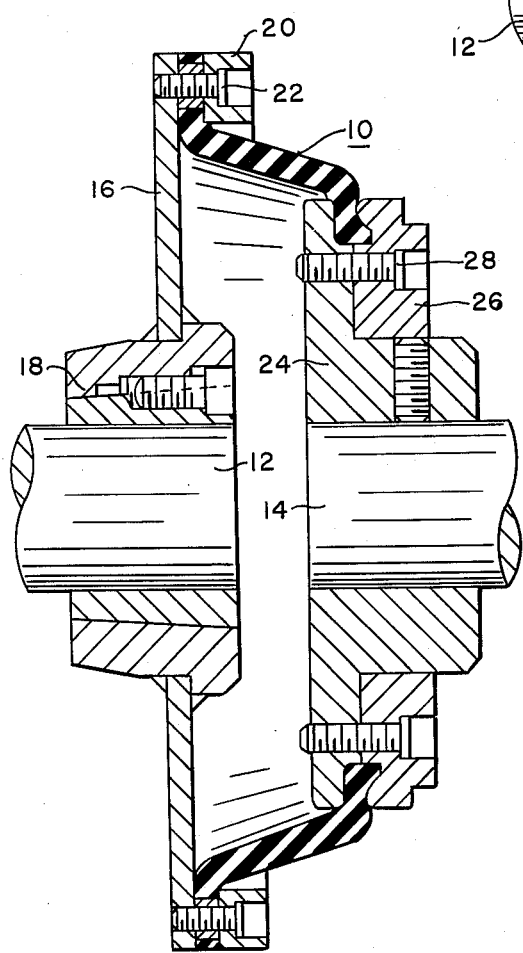
FIGURE 1 is a vertical cross sectional view of one coupling mounted to connect two machines for rotation.

In the drawings, numeral 10 designates the flange-type flexible coupling connecting two shafts 12 and 14 for rotation together. As seen in FIGURE 1, disc 16 is attached to shaft 12 by mounting flange 18 to rotate therewith, and the flexible coupling is attached to the disc by clamping ring 20 and bolts 22. The coupling is attached to shaft 14 by mounting flange 24 and ring 26, clamping the coupling between them, and held tightly by bolts 28. The coupling may be mounted on a flywheel 30 as shown in FIGURE 2, and various other clamps and mounting devices may be used, and variations of the edges of the flange-type couplings may be made to accommodate these clamping devices, provided the modification of the edges and the clamping devices do not interfere with the operation of the coupling as designed by the criteria and formulae given herein. However, most standard clamping devices and edges may be used with the couplings within these limits.

A flexible coupling is made of layers 32 of rubber alternating with layers 34 of a corded material, such as cloth. This corded material is placed in layers or plies parallel with edge 40 of the coupling shown in FIGURE 3, and is usually placed so that the line of the cords makes an angle of 45° with line 44 of FIGURE 4. Variations in this angle would produce variations in the flexibility of the coupling, but it would also vary the strength of the coupling and produce an unpredictable effect for some angles.

Figure 3:
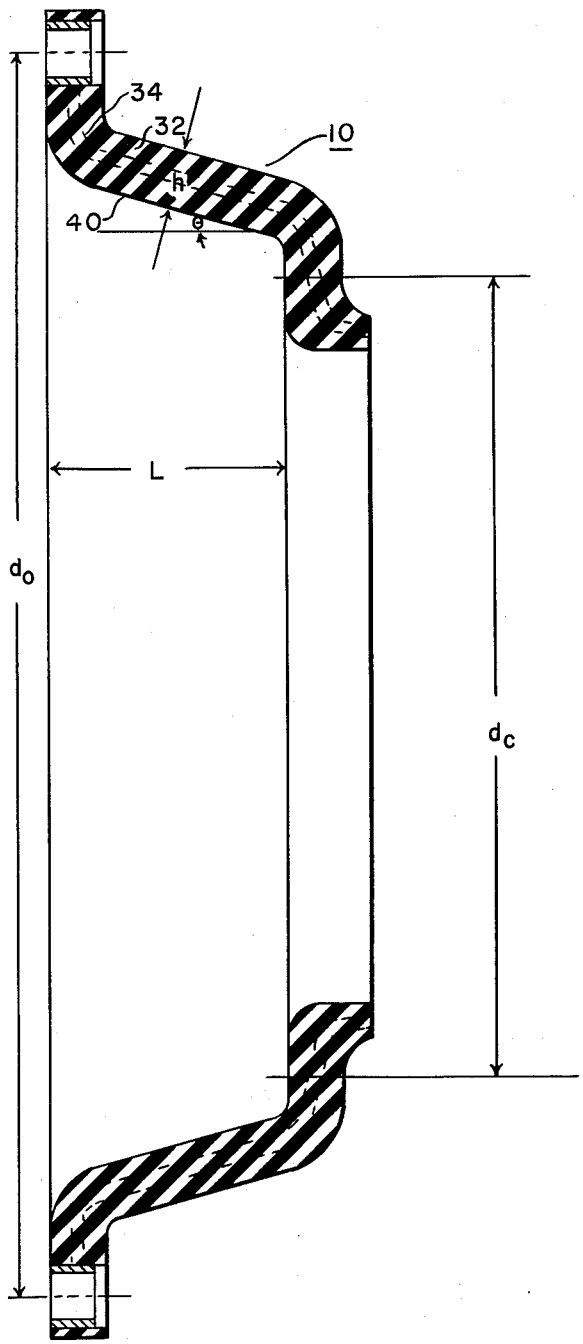
FIGURE 3 is a vertical cross section of a flange-type flexible coupling with the dimensions used in the present criteria and formulae indicated thereon.
Figure 4:
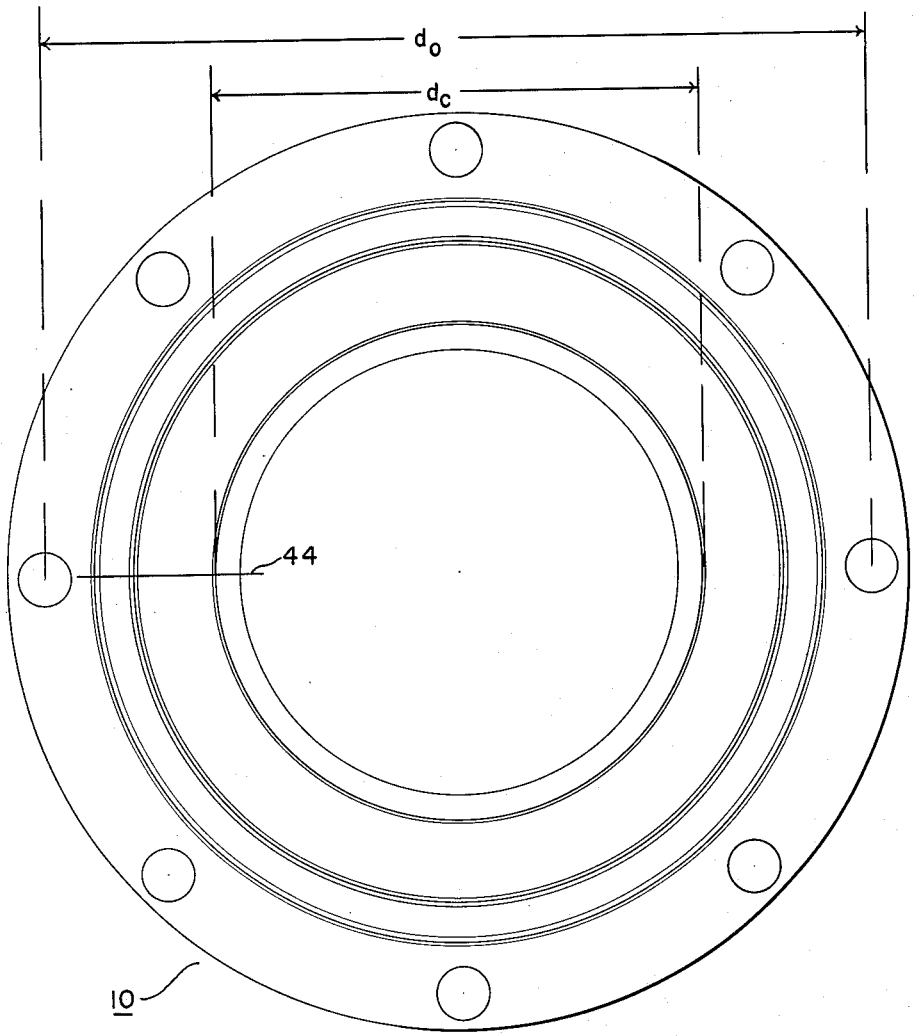
FIGURE 4 is a front elevational view of one of the flange-type couplings to which the present invention applies.
Figure 5:
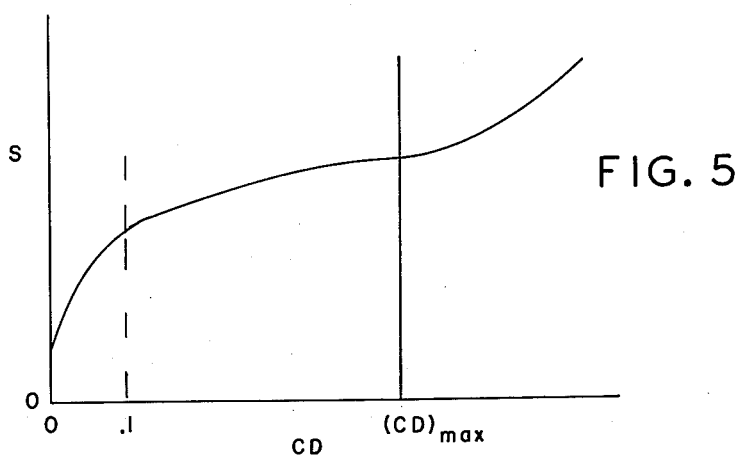
FIGURE 5 is a graph showing how the stiffness of the present coupling varies as the cord density increases.

One of the important concepts in the use of the present criteria and formulae is the cord density, denoted by CD and defined by the following expression:

$$CD = nt/h$$

where $n$ is the number of plies, or layers, of cord in the coupling; $t$ is the thickness of each of the plies exclusive of the rubber connecting the plies; and $h$ is the thickness of the coupling, as shown in FIGURE 3. From this formula, it is seen that the cord density can range from a minimum of 0 at which the number of plies would equal 0, to a maximum of 1, at which the number of plies times the thickness of each ply is equal to the total thickness $h$ of the flexible element and the coupling is made entirely of cord. It is clear that the coupling will have a certain amount of stiffness even when there is no cord in it, since pure rubber has a certain amount of inherent stiffness. This is indicated in FIGURE 5 by the fact that the curve showing the stiffness with respect to the cord density starts at a value of stiffness above 0. As seen in the graph, the stiffness of the coupling increases with increasing cord density, the curve being monotonic with one point of inflection.

Cord density may be considered in three ranges, with a formula for each of them. The first range is $0 \leq CD \leq .1$, where the curve bends rapidly; the second is $0.1 \leq CD \leq (CD)_{max}$ where $(CD)_{max}$ is a quantity defined hereunder; and the last range is $(CD)_{max} \angle CD \leq 1.0$. In this last range, the cord density is so high that the coupling is inflexible and tends to slip out of its clamps when in use. Hence, it is desirable to determine a value for $(CD)_{max}$ so that couplings will not be manufactured with a cord density falling within the last named range. As this is a critical point on an otherwise relatively continuous curve of increasing stiffness, the choice is arbitrary within a small range near the point of inflection, and the choice of the point of inflection for this value is a reasonable one. It has been found in numerous experiments $(CD)_{max}$, determined by this point of inflection, may be represented by $$(CD)_{max} = 0.00592 \, (d_c/h)^{4/3}$$

where $d_c$ is the clamping diameter, or the diameter of the smaller of the two claming edges of the flange-type flexible coupling, as shown in FIGURE 3, and $h$ is the same quantity as in the previous formula, i.e. the thickness of the flexible element in the coupling.

In a manner similar to the buckling of a structural column under compressive loading, the flexible element with a prescribed length to cross sectional area ratio will buckle, or become knotted, when the torque exceeds a certain limiting value. In order to eliminate this undesirable condition within the operating torque range of a machine, and move its occurrence to a torque value higher than any occurring in the normal operation of the machine, the above-mentioned ratio, length to cross sectional area, must be limited in value in the design of coupling elements. For the flange-type elements with which the present invention is concerned, the quantity $L/h$ may be used, where L is the length, or depth, of the coupling with the exception of one clamping edge, since $h$ is a characteristic of the cross sectional area. From conclusive experimental evidence, it has been found that buckling does not occur in the operating torque range of the coupling when $L/H \leq 5.6$. The following table is indicative of the evidence obtained (the values being extracted from a large number of experimental results):

| $L/h$: | Angle of twist at which buckling occurs, degrees |
|---|---|
| 5.6 | 5 |
| 5.00 | ∖5 |
| 4.30 | ∖6 |
| 6.25 | ∠3 |
| 6.30 | ∠3 |
| 6.66 | ∠1½ |

In FIGURE 3, $d_c$, L and $h$ have already been explained, $d_o$ is the diameter of the larger of the two claimping edges, or the outside diameter, and $\theta$ is the angle that the side of the flexible element makes with a perpendicular to the plane of the clamping faces.

In the first range of cord density, $0 \leq CD \leq 0.1$, the stiffness of a projected coupling is determined by the formula $$S/S_o = 1 + (2.07)(L/H)^{-2.75}(d_c/h)^2(CD)^{0.25}$$

where $S_o$ is the value that the stiffness in in.-lb./degrees would have if the coupling were made of pure rubber, calculated from the S-value for $CD = 0.1$ as given by the corresponding expression for the range $0.1 \leq CD(CD)_{max}$. The above formula holds for $0 \leq CD \leq 0.1$ within the following critical ranges determined by experiment:

$$1.42 \leq d_o/d_c \leq 1.78$$
$$16.85 \leq d_c/h \leq 23.9$$
$$3.37 \leq d_c/L \leq 5.00$$
$$16° \leq \theta \leq 28°$$

Figure 6:
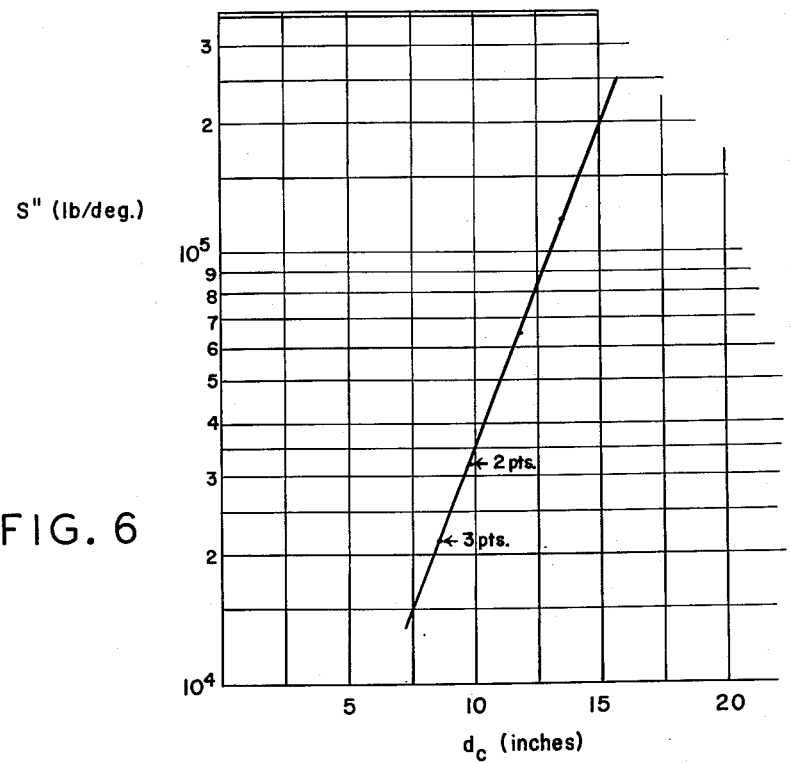
FIGURE 6 is a graph utilized in one of the formulae of the present invention.

The second range of cord density requires a different formula, in that the curve representing the stiffness of the coupling in FIGURE 2 changes from a highly curved line to a reasonably close approximation of a straight line near the point determined by $CD = 0.1$. In the range $0.1 \leq CD \leq (CD)_{max}$ the following formula has been found to hold:

$$S = S''(\tan \theta)^{-0.919}(d_c/h)^{-0.942}(CD)^{0.226} \text{ in. lb./deg.}$$

where $S'' = f(d_c)$ as shown in FIGURE 6 with a representative sample of the points experimentally determined to obtain this graph. The same critical ranges as those for the previous formula hold for this formula, so that the only difference in the use of these formulae is the range of cord density to which they apply.

When two machines are to be connected, frequently the connecting discs are present on the machines as flywheels, clutch plates, and other similar machine elements, and when there are no such plates already present, a standard coupling mount may be mounted on the machines without difficulty. Thus the values for $d_o$ and $d_c$ are fixed within small limits. It is usually true that the ratio $d_o/d_c$ falls within the range stated above, and in the few cases in which it does not, it is often possible to modify the mounts slightly so that the ratio will. The minimum stiffness required for the coupling is also determined by the character of the machines and the work which they will do, and this value of the stiffness is readily computed from well known formulae. Thus, in the use of the present formulae, only $\theta$, L, $h$ and CD must be determined, and these values are limited by the fact that each appears in one or more of the critical ranges. For example, $\theta$ is limited between 16 and 28 degrees, but this also limits L, since $\theta$ depends to some extent on the values for $d_o$, $d_c$ and L, as seen in FIGURE 3. Also, the fact that $L/h$ must be less than 5.6 for proper operation of the coupling limits the range of values of each of these variables in planning the construction of the required flexible coupling.

Despite the fact that the values that may be chosen to satisfy all of the inequalities and the formula often appear to be severely limited, it very rarely happens that there is no set of values which will satisfy all of the conditions. When there is no such set of values, it is usually quite simple to modify the mount so that a set of values can be found. Once the values are found, the structure of the coupling is determined and the coupling may be immediately manufactured, without extensive laboratory work and expensive models being necessary. Of course, the designed stiffness of the coupling is no more than an average quantity, due to the slightly varying behavior of rubber and cord from coupling to coupling, but this is true also of couplings designed by experimental work and is not important to the present invention.

With flexible couplings, it is possible to tune the natural frequency of torsional vibration of the connection by varying the stiffness of the coupling. If the machinery operates at a speed such that the force vibration is at the same frequency as one of the natural frequencies, the system will be in a state of resonance and the amplitude of the vibrations will become very large, frequently resulting in damage to the machinery. Since the natural frequency of most conventional couplings rises with increasing impressed torque, the natural frequency and the torsional vibration may become tuned within the normal operating range of the coupling when this range is disposed between two natural frequencies. It is possible to overcome this difficulty within the present criteria with the flange-type coupling, since the instantaneous stiffness of the coupling is reduced as the impressed torque increases, thus reacting oppositely to the above described conventional coupling.

Although this invention has been described in detail herein, it is to be understood that the description is for the purpose of illustration only and is not definitive of the limits of the inventive idea.

I claim:

1. A flexible coupling comprising a first rim with diameter $d_o$, a second rim with diameter $d_c$, the planes of said rims being spaced apart a distance L, and an annular body connecting said rims composed of alternating layers of corded material and rubber-like material, there being $n$ layers of corded material, each layer of corded material having a thickness $t$, said body having a thickness $h$, being inclined at an angle of $(90°-\theta)$ to the planes of the rims and having a stiffness S, said corded material having a density CD defined by $$CD=nt/h$$

and said body being formed in accordance with values for $d_o$, CD, $d_c$, $h$, L, $\theta$, and S such that $$1.42 \leq d_o/d_c \leq 1.78$$
$$16.85 \leq d_c/h \leq 23.9$$
$$3.37 \leq d_c/L \leq 5.00$$
$$16° \leq \theta \leq 28°$$
$$L/h<5.6$$
$$0 \leq CD \leq (CD)_{max}$$
$$S/S_o=1+(2.07)(L/h)^{-2.76}(d_c/h)^2(CD)^{0.25}$$

and $$S=S''(\tan \theta)^{-0.919}(d_c/h)^{-0.942}(CD)^{0.226}$$

where $$S''=f(d_c)$$

and $$(CD)_{max}=0.00592(d_c/h)^{4/3}$$

2. A flexible coupling comprising a first rim with diameter $d_o$, a second rim with diameter $d_c$, the planes of said rims spaced apart a distance L, and an annular body connecting said rims composed of alternating layers of corded material and rubber-like material, there being $n$ layers of corded material, each layer of corded material having a thickness $t$, said body having a thickness $h$ and a stiffness S and being inclined at an angle of $(90°-\theta)$ to the planes of the rims, said corded material having a density CD defined by $$CD=nt/h$$

and said body being formed in accordance with values for $d_o$, $d_c$, $h$, L, $\theta$, CD and S such that $$1.42 \leq d_o/d_c \leq 1.78$$
$$16.85 \leq d_c/h \leq 23.9$$
$$3.37 \leq d_c/L \leq 5.00$$
$$16° \leq \theta \leq 28°$$
$$L/h<5.6$$
$$0 \leq CD<0.1$$

and $$S/S_o=1+(2.07)(L/h)^{-2.76}(d_c/h)^2(CD)^{0.25}$$

3. A flexible coupling comprising a first rim with diameter $d_o$, a second rim with diameter $d_c$, the planes of said rims being spaced apart a distance L, and an annular body connecting said rims and composed of alternating layers of corded material and rubber-like material, there being $n$ layers of corded material, each layer of corded material having a thickness $t$, said body having a thickness $h$ and a stiffness S and being inclined at an angle $(90°-\theta)$ to the planes of the rims, said corded material having a density CD defined by $$CD=n/th$$

and said body being formed in accordance with values for $d_o$, $d_c$ $h$, L, $\theta$ CD, and S such that $$1.42 \leq d_o/d_c \leq 1.78$$
$$16.85 \leq d_c/h \leq 23.9$$
$$3.37 \leq d_c/L \leq 5.00$$
$$16° \leq \theta \leq 28°$$
$$L/h<5.6$$
$$0.1 \leq CD \leq (CD)_{max}$$

and $$S=S''(\tan \theta)^{-0.919}(d_c/h)^{-0.942}(CD)^{0.226}$$

where $$S''=f(d_c)$$

and $$(CD)_{max}=0.00592(d_c/h)^{4/3}$$

References Cited in the file of this patent

FOREIGN PATENTS

| | | |
|---|---|---|
| 663,350 | Great Britain | Dec. 19, 1951 |
| 870,051 | Germany | Mar. 9, 1953 |